US012675243B2

(12) United States Patent
Chatterjee et al.

(10) Patent No.: US 12,675,243 B2
(45) Date of Patent: Jul. 7, 2026

(54) COLLECTIVE OPERATION USING A NETWORK-ATTACHED MEMORY

(71) Applicant: HEWLETT PACKARD ENTERPRISE DEVELOPMENT LP, Spring, TX (US)

(72) Inventors: Soumitra Chatterjee, Bangalore (IN); Chinmay Ghosh, Bangalore (IN); Mashood Abdulla Kodavanji, Bangalore (IN); Sharad Singhal, Belmont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/349,318

(22) Filed: Jul. 10, 2023

(65) Prior Publication Data

US 2025/0021273 A1      Jan. 16, 2025

(51) Int. Cl.
G06F 3/06          (2006.01)

(52) U.S. Cl.
CPC .......... G06F 3/0665 (2013.01); G06F 3/0622 (2013.01); G06F 3/067 (2013.01)

(58) Field of Classification Search
CPC ....... G06F 3/0665; G06F 3/0622; G06F 3/067
See application file for complete search history.

(56) References Cited

U.S. PATENT DOCUMENTS

| | | | |
|---|---|---|---|
| 6,212,617 B1 | 4/2001 | Hardwick | |
| 6,292,822 B1 | 9/2001 | Hardwick | |
| 6,334,138 B1 | 12/2001 | Kureya | |
| 7,958,513 B2 | 6/2011 | Jia et al. | |
| 8,024,529 B2 | 9/2011 | Ezzat | |
| 8,756,564 B2 | 6/2014 | Hamilton, II et al. | |
| 9,811,316 B2 | 11/2017 | Archer et al. | |
| 10,778,738 B2 | 9/2020 | Zheng et al. | |
| 12,443,518 B2 | 10/2025 | Chatterjee et al. | |
| 12,443,525 B2 | 10/2025 | Chatterjee et al. | |
| 2008/0022079 A1 | 1/2008 | Archer et al. | |
| 2010/0205611 A1 | 8/2010 | Wagner et al. | |
| 2018/0275907 A1* | 9/2018 | Subramanian ...... | G06F 12/0253 |
| 2019/0082009 A1* | 3/2019 | Gupta ..................... | G06F 3/067 |

(Continued)

OTHER PUBLICATIONS

Ahn et al., A Scalable Processing-in-Memory Accelerator for Parallel Graph Processing, Jun. 2015 (13 pages).

(Continued)

*Primary Examiner* — Masud K Khan
(74) *Attorney, Agent, or Firm* — Fletcher Yoder, P.C.

(57)          ABSTRACT

In some examples, a processor receives a first request to allocate a memory region for a collective operation by process entities in a plurality of computer nodes. In response to the first request, the processor creates a virtual address for the memory region and allocates the memory region in a network-attached memory coupled to the plurality of computer nodes over a network. The processor correlates the virtual address to an address of the memory region in mapping information. The processor identifies the memory region in the network-attached memory by obtaining the address of the memory region from the mapping information using the virtual address in a second request. In response to the second request, the processor performs the collective operation.

20 Claims, 9 Drawing Sheets

(56) References Cited

U.S. PATENT DOCUMENTS

| | | | | |
|---|---|---|---|---|
| 2019/0129888 A1* | 5/2019 | Bowman | | G06F 3/0604 |
| 2019/0196907 A1* | 6/2019 | Khan | | G06F 3/0619 |
| 2020/0065150 A1* | 2/2020 | Wang | | G06F 3/067 |
| 2023/0138290 A1* | 5/2023 | Ahmed | | G06F 3/0604 |
| | | | | 711/154 |
| 2023/0236995 A1* | 7/2023 | Jayaraman | | G06F 12/0813 |
| | | | | 710/308 |
| 2025/0013386 A1 | 1/2025 | Singhal et al. | | |
| 2025/0021273 A1 | 1/2025 | Chatterjee et al. | | |

OTHER PUBLICATIONS

CXL Compute Express Link: The Breakthrough CPU-to-Device Interconnect CXL, 2022 (2 pages).

Gropp, William, Lecture 29: Collective Communication and Computation in MPI downloaded Jun. 5, 2023 (28 pages).

HP Enterprise, Introduction, OpenFAM Reference Implementation, May 30, 2023 (4 pages).

HP Enterprise, openfam::fam:fam_allocate, OpenFAM Reference Implementation downloaded Jun. 14, 2023 (3 pages).

HP Enterprise, openfam:fam::fam_put, OpenFAM Reference Implementation downloaded Jun. 14, 2023 (3 pages).

Kang et al., Parallel and Distributed Systems, Improving MPI Collective I/O for High Volume Non-contiguous Requests With Intra-node Aggregation, Nov. 2020 (14 pages).

MPI Forum, Collective Operation, 4.1 Introduction and Overview, Jun. 12, 1995 (4 pages).

MPI, 4.10. The Info Object downloaded Jun. 5, 2023 (4 pages).

MPI, The Message Passing Interface (MPI)standard downloaded Jun. 5, 2023 (2 pages).

openfam.org, OpenFAM—Programming fabric-attached memory, Jun. 5, 2023 (4 pages).

Readme, Bale downloaded Jun. 10, 2023 (3 pages).

Singhal et al., U.S. Appl. No. 18/346,406 entitled Operation Execution on Memory Servers filed Jul. 3, 2023 (38 pages).

Voltaire, Achieving Breakthrough MPI Performance with Fabric Collectives Offload, Dec. 2010 (12 pages).

Wikipedia, "Collective operation", available online at <https://en.wikipedia.org/w/index.php?title=Collective_operation&oldid=1136552251>, Jan. 30, 2023, 7 pages.

Wikipedia, Message Passing Interface last edited May 13, 2023 (16 pages).

* cited by examiner

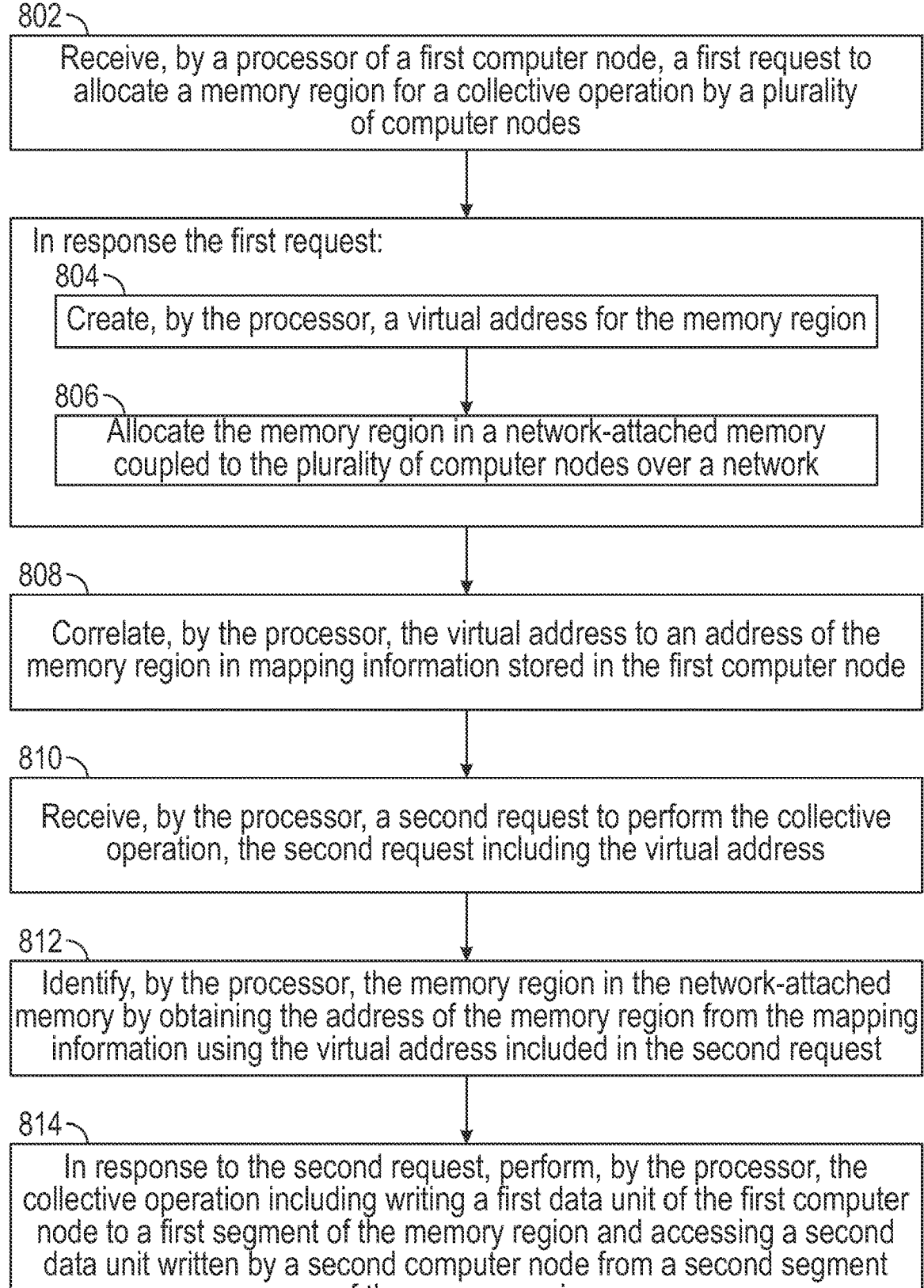

802 —
Receive, by a processor of a first computer node, a first request to allocate a memory region for a collective operation by a plurality of computer nodes In response the first request:

804 —
Create, by the processor, a virtual address for the memory region

806 —
Allocate the memory region in a network-attached memory coupled to the plurality of computer nodes over a network 808 —
Correlate, by the processor, the virtual address to an address of the memory region in mapping information stored in the first computer node 810 —
Receive, by the processor, a second request to perform the collective operation, the second request including the virtual address 812 —
Identify, by the processor, the memory region in the network-attached memory by obtaining the address of the memory region from the mapping information using the virtual address included in the second request 814 —
In response to the second request, perform, by the processor, the collective operation including writing a first data unit of the first computer node to a first segment of the memory region and accessing a second data unit written by a second computer node from a second segment of the memory region

Storage Medium

1002

Memory Region Allocation Request Reception Instructions

1004

Virtual Address and Memory Region Allocation Instructions

1006

Mapping Information Instructions

1008

Collective Operation Request Reception Instructions

1010

Memory Region Identification Instructions

1012

Collective Operation Performance Instructions

COLLECTIVE OPERATION USING A NETWORK-ATTACHED MEMORY

BRIEF DESCRIPTION OF THE DRAWINGS

Some implementations of the present disclosure are described with respect to the following figures.

FIG. 8 depicts a flow of a collective operation according to some examples.

Figure 1:
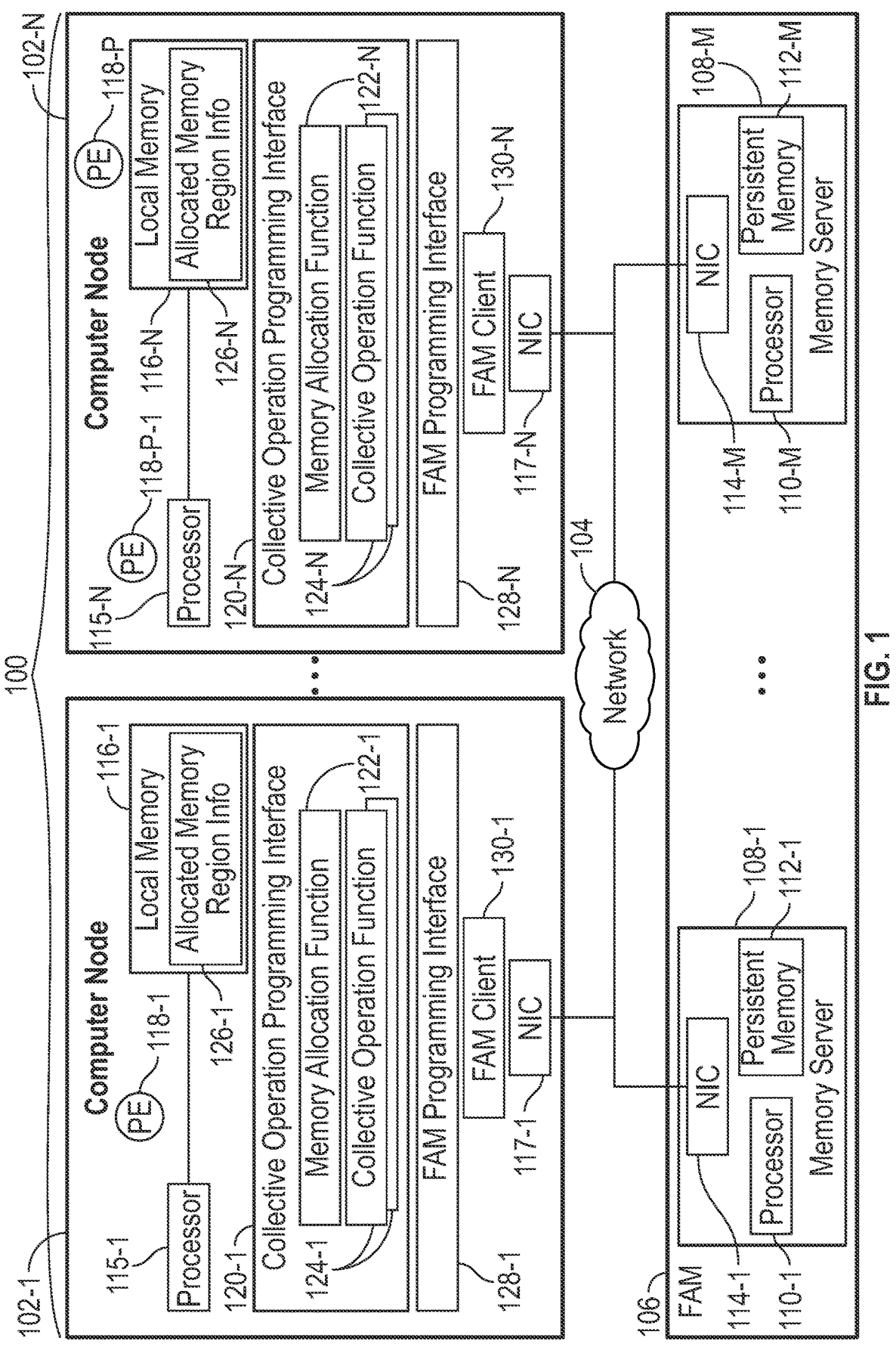
FIG. 1 is a block diagram of an arrangement that includes a cluster of computer nodes coupled to a network-attached memory, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A "collective operation" is an operation that includes a pattern of communications (and possibly computations) among process entities running in multiple computer nodes. An issue associated with collective operations in some systems is that a relatively large quantity of messages may be passed between process entities that are involved in the collective operations. As an example, messages passed between process entities for a collective operation can include data distributed among the process entities as part of the collective operation. If there are P (P≥2) process entities, potentially there may be P*(P−1) messages among the process entities for certain types of collective operations, such as collective operations that involve a broadcast of data, scattering of data, gathering of data, or other operations in which tasks are performed by multiple process entities (examples of collective operations are discussed further below). In a large system with many process entities (e.g., hundreds or thousands of process entities), the communication of a large quantity of messages can place a great load on resources of computer nodes, including processing resources, communication resources, and/or memory resources.

Another issue associated with collective operations in some systems is that the collective operations may involve computations that burden processing resources of computer nodes. The computations can include aggregation operations (e.g., summing data values, computing an average or median of data values, or any other operations that aggregate data values), sort operations, merge operations, or other operations that involve movement of data and/or computations based on data. If the processing resources of the computer nodes are overloaded, then performance of a collective operation can suffer.

In accordance with some implementations of the present disclosure, to address one or more of the foregoing issues, techniques or mechanisms are provided to employ memory regions allocated in a network-attached memory coupled to a cluster of computer nodes over a network for performing collective operations. A collective operation initiated using a collective operation function invoked by a process entity is able to access a memory region in the network-attached memory so that the computer nodes can exchange data using the memory region instead of using messages between the computer nodes. As a result, assuming there are P process entities across the computer nodes, the quantity of communications that are involved in a collective operation based on use of the allocated memory region can be reduced to 2*P, as compared to P*(P−1) communications based on message passing between the P process entities. Also, the network-attached memory may include memory servers with available processors that can be leveraged to perform computations of collective operations. In accordance with some examples of the present disclosure, the computations of collective operations can be offloaded to the available processors of the memory servers to reduce the likelihood of overloading processing resources of the computer nodes.

A parallel computing architecture includes a cluster of computer nodes that are able to perform operations in parallel. A program executing in one or more of the computer nodes in the cluster can start an operation that includes tasks that are distributed across the cluster of computers.

In an example, collective operations in a parallel computing architecture can be implemented based on use of an interface that passes messages among process entities in computer nodes. An example of such an interface is a Message Passing Interface (MPI), which defines the syntax and semantics of library routines to support parallel computations, including MPI collective operations, across computer nodes. In other examples, other types of interfaces that provide for communications among process entities in computer nodes can be used to implement collective operations, such an interface according to a parallel programming model. An example of a parallel programming model is a Global Address Space Programming Interface (GASPI) model.

A collective operation can be executed in response to a request from a requesting entity, such as a user, program, or machine. When the collective operation is executed, process entities in the computer nodes can communicate with one another over a communication interface as the collective operation progresses in the computer nodes. The process entities may be instances of one or more programs under execution in the computer nodes. Such process entities may also be referred to as "processes" or "ranks" of the program(s).

The communication interface provides a mechanism by which the process entities are able to send information to one another. The information can include data on which the collective operation is applied, as well as control information such as status information indicating a status of the collective operation, commands to trigger requested tasks, synchronization events to support synchronization of the process entities during the collective operation, or another type of information to perform a control or management task.

An example of a communication interface is provided by MPI. MPI implements a programming interface (referred to as an application programming interface or API) including functions (also referred to as routines or methods) that can be called (invoked) by process entities executing on computer nodes. The functions include MPI collective functions that when invoked perform different collective operations.

As noted above, an issue associated with collective operations (such as those performed using MPI collective functions) is that a relatively large quantity of messages may be passed between ranks (process entities) that are involved in the collective operations. Another issue associated with collective operations is that the collective operations may involve computations that burden processing resources of computer nodes, which can overload the computer nodes.

In accordance with some implementations of the present disclosure, to address one or more of the foregoing issues, techniques or mechanisms are provided to employ a network-attached memory. An example of a network-attached memory is a "fabric attached memory (FAM)." A memory allocation function can be invoked by a process entity in a computer node to allocate a memory region in the network-attached memory, where the memory region is available across computer nodes of the cluster of computer nodes. Once the memory region is allocated using the memory allocation function, a process entity can invoke a collective operation function to initiate a collective operation across the cluster of computer nodes. The collective operation initiated using the collective operation function is able to access the memory region so that the computer nodes can exchange data using the memory region instead of using messages between the computer nodes. As a result, assuming there are P ranks across the computer nodes, the quantity of communications that are involved in a collective operation based on use of the allocated memory region can be reduced to $2*(P-1)$, as compared to $P*(P-1)$ communications based on message passing between the P ranks.

Also, in accordance with some examples of the present disclosure, the computations of collective operations can be offloaded to the available processors of memory servers of the network-attached memory to reduce the likelihood of overloading processing resources of the computer nodes.

Techniques or mechanisms according to some implementations of the present disclosure can improve computer functionality in a computing system that includes computer nodes and memory servers of a network-attached memory, by invoking various functions to implement collective operations that leverage the network-attached memory to reduce a quantity of information passed between process entities, and by offloading computations from the computer nodes to memory servers of the network-attached memory to reduce the likelihood of the computer nodes being overloaded.

FIG. 1 is a block diagram of an example system 100 that includes multiple computer nodes 102-1 to 102-N (N≥2). The computer nodes 102-1 to 102-N are part of a cluster of computer nodes. The computer nodes 102-1 to 102-N are interconnected by a network 104 to a FAM 106 (or another type of a network-attached memory). The FAM 106 includes multiple memory servers 108-1 to 108-M (M≥2). Note that M can be the same as or different from N. More generally, N≥1 and M≥1, which means that the system 100 can include one or more computer nodes and/or one or more memory servers.

Examples of the network 104 can include an interconnect (e.g., a throughput, low-latency interconnect) between processors and memories, which can be based on an open-source standard, a protocol defined by a standards body, or a proprietary implementation. A "computer node" can refer to a computer, a portion of a computer, or a collection of multiple computers.

Each memory server includes a respective processor and persistent memory. For example, the memory server 108-1 includes a processor 110-1 and a persistent memory 112-1, and the memory server 108-M includes a processor 110-M and a persistent memory 112-M. More generally, a memory server can include one or more processors. Also, in a different example, a persistent memory may be external of the memory server; in this example, the memory server is connected to the persistent memory and is able to access the persistent memory.

A persistent memory can be implemented with one or more persistent memory devices, such as flash memory devices, disk-based storage devices, or other types of memory devices that are able to retain data when power is removed. A processor of a memory server can refer to a central processing unit (CPU) that executes an operating system (OS) and other machine-readable instructions (including firmware such as a Basic Input/Output System (BIOS) and an application program) of the memory server. Alternatively or additionally, a processor of the memory server can refer to another type of processor, such as a graphics processing unit (GPU) that handles specific computations in the memory server.

In other examples, a memory server includes a volatile memory, which is memory that loses its data if power is removed from the memory. A volatile memory can be implemented with one or more volatile memory devices, such as dynamic random access memory (DRAM) devices, static random access memory (SRAM) devices, or other types of memory devices that retain data while powered but lose the data when power is removed. Alternatively, a memory server includes both a volatile memory and a persistent memory.

Each memory server further includes a network interface controller (NIC) to allow the memory server to communicate over the network 104. The NIC can include a transceiver that transmits and receives signals. Further, the NIC can include one or more protocol layers that perform communications over the network 104 according to respective one or more network protocols. The memory server 108-1 includes a NIC 114-1, and the memory server 108-M includes a NIC 114-M.

Each computer node also includes a processor and a local memory. For example, the computer node 102-1 includes a processor 115-1 and a local memory 116-1, and the computer node 102-N includes a processor 115-N and a local memory 116-N. More generally, a computer node can include one or more processors. A local memory can be implemented using one or more memory devices, which can be any or some combination of the following: a dynamic random access memory (DRAM) device, a static random access memory (SRAM) device, a flash memory device, a disk-based storage device, or any other type of memory device.

Each computer node also includes a NIC to communicate over the network 104. The computer node 102-1 includes a NIC 117-1, and the computer node 102-N includes a NIC 117-N.

A processor of a computer node is able to execute one or more process entities (PEs). A PE is a rank associated with a program under execution in the computer node. The program can be an application program or another type of program, such as an OS, firmware, and another type of machine-readable instructions. As shown in FIG. 1, the processor 115-1 executes a PE 118-1, and the processor 115-N executes PEs 118-P–1 to 118-P. A total of P PEs are executed across the computer nodes 102-1 to 102-N. The P PEs make up P ranks that can cooperate to perform a collective operation. The P ranks are part of a communication group that together perform the collective operation. Although a specific quantity of PEs is shown in the computer nodes 102-1 to 102-N, in other examples, a different quantity of PEs can execute in each computer node. In further examples, a same quantity of PEs can be executed in each computer node.

Each PE is able to access data of the FAM 106. The access can include a read access to read data from the FAM 106 or a write access to write data to the FAM 106. Additionally, a PE can perform computations on data read from the FAM 106 or data to be written to the FAM 106.

As further shown in FIG. 1, the computing node 102-1 includes a collective operation programming interface 120-1. In some examples, the collective operation programming interface 120-1 can be an API, such as an MPI API or another type of API. The collective operation programming interface 120-1 includes a memory allocation function 122-1 that can be called (invoked) by a PE (e.g., 118-1) in the computer node 102-1 to allocate a memory region in the FAM 106 to perform a collective operation.

The collective operation programming interface 120-1 also includes collective operation functions 124-1 that can be called by a PE (e.g., 118-1) in the computer node 102-1 to initiate corresponding collective operations that can employ the allocated memory region in the FAM 106.

The computer node 102-N similarly includes a collective operation programming interface 120-N, which includes a memory allocation function 122-N and collective operation functions 124-N. The collective operation programming interface 120-1 can be accessed by a PE (e.g., 118-P–1 or 118-P) in the computer node 102-N. In examples where MPI is used, the memory allocation functions 122-1 to 122-N are MPI_Alloc_mem( ) functions, and the collective operation functions 124-1 to 124-N are MPI collective functions.

In an example, in response to the PE 118-1 calling the memory allocation function 122-1, the memory allocation function 122-1 allocates a memory region in the FAM 106 for use by the ranks involved in a collective operation. It is assumed that the ranks can include PEs 118-1 to 118-P. In other examples, the ranks involved in a collective operation can include a subset (less than all) of the PEs 118-1 to 118-P.

In the ensuing discussion, reference to "persistent memory" is to a collection of any one or more of the persistent memories 112-1 to 112-M of the memory servers 108-1 to 108-M.

After the memory region is allocated by the memory allocation function 122-1, the PEs 118-1 to 118-P can write data to the allocated memory region and read data from the allocated memory region. The information pertaining to the allocated memory region can be stored as allocated memory region information in each of the computer nodes 102-1 to 102-N. For example, allocated memory region information 126-1 is stored in the local memory 116-1 of the computer node 102-1, and allocated memory region information 126-N is stored in the local memory 116-N of the computer node 102-N.

After the memory region has been allocated by a memory allocation function invoked by a given PE, any of the PEs

118-1 to 118-P can invoke a collective operation function to initiate a collective operation that makes use of the allocated memory region.

In the example of FIG. 1, the computer node 102-1 further includes a FAM programming interface 128-1, and the computer node 102-N includes an FAM programming interface 128-N. A FAM programming interface can include an API, a library, or any other program-accessible subsystem that is invoked in a computer node to perform an operation with respect to the FAM 106, including a read operation, a write operation, a computation offloaded to the FAM 106, or another operation involving data.

In an example, a FAM programming interface can include an API that includes functions that are useable by computer nodes (or more specifically, by PEs in computer nodes) to manage a FAM and to access data of the FAM. An example of such an API is an OpenFAM API.

Each computer node further includes a FAM client, which is a program executed in the computer node to manage the access of the FAM 106, such as in response to calls to a FAM programming interface. The computer node 102-1 includes a FAM client 130-1, and the computer node 102-N includes a FAM client 130-N.

Figure 2:
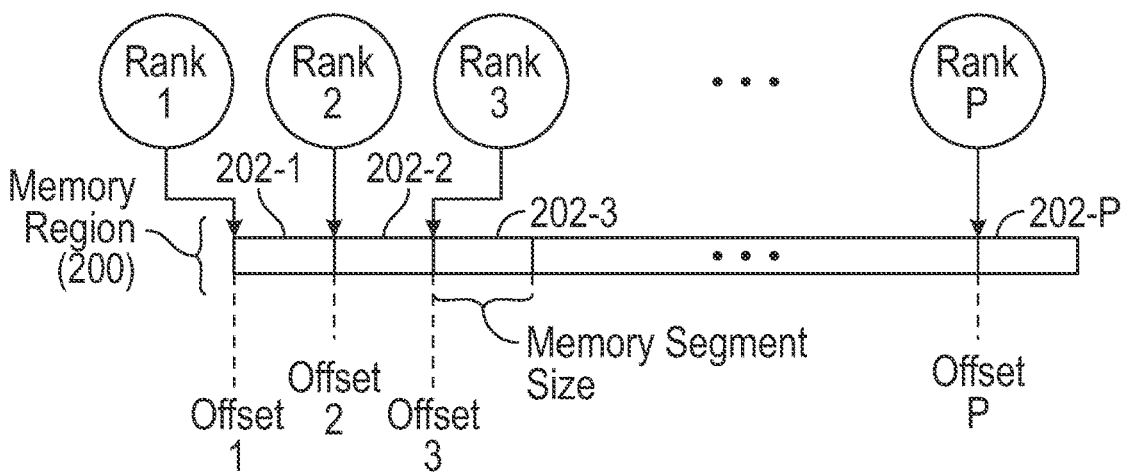
FIG. 2 is a block diagram of a memory region with memory segments allocated to ranks according to some examples.

Referring to FIG. 2, the memory allocation function 122-1 when invoked allocates a memory region 200 in the persistent memory of the FAM 106. Each of the PEs (ranks 1 to P) is allocated a corresponding segment of the memory region. In some examples, the memory portion of the memory region allocated to a given rank includes a memory portion of a specified memory portion size at a corresponding fixed offset. An "offset" refers to a memory location (e.g., represented by memory address) of the persistent memory. For the P ranks, the memory region 200 is divided into P memory segments 202-1 to 202-P allocated to the corresponding P ranks (ranks 1 to P). It is assumed in some examples that each of the memory segments 202-1 to 202-P has the same memory segment size. A memory segment 202-j (j=1 to P) allocated to rank j starts at offset j. Thus, in the example of FIG. 2, the memory segment 202-1 allocated to rank 1 starts at offset 1, the memory segment 202-2 allocated to rank 2 starts at offset 2, the memory segment 202-3 allocated to rank 3 starts at offset 3, and the memory segment 202-P allocated to rank P starts at offset P. Although examples discussed herein refer to ranks starting at 1, in other examples, ranks can start at other numbers, such as 0 or a different starting number.

In some examples, an offset is determined based on a product of a rank number (j) and the memory segment size. The rank number is an identifier of a rank. For example, PEs 118-1 to 118-P can have rank numbers 1 to P.

One rank (e.g., rank 1) calls the memory allocation function 122-1 to allocate the memory region 200. Each of the other ranks (e.g., ranks 2 to P) similarly call a memory allocation function of a collective operation programming interface to obtain information pertaining to the allocated memory region 200, so that the other ranks can access their allocated memory segments of the allocated memory region 200.

Examples of Collective Operations

The following provides various examples of collective operations that can be performed by ranks in the computer nodes 102-1 to 102-N of FIG. 1.

Figure 3A:
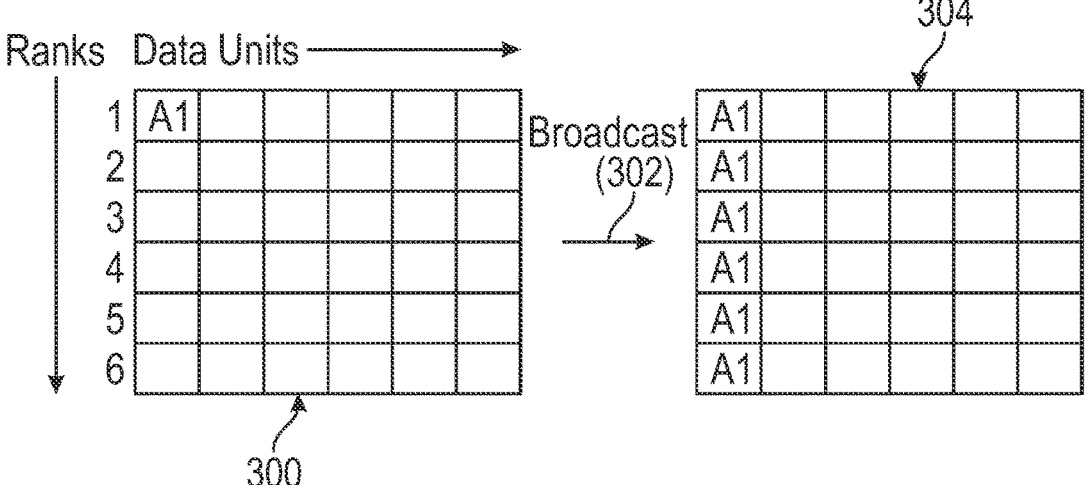
FIGS. 3A-3D illustrate examples of collective operations that can be performed using a system according to some examples.

FIG. 3A shows an example broadcast collective operation. An array 300 includes rows representing ranks 1-6 and columns representing data units. A "data unit" can refer to a portion of data to be communicated among ranks. A data unit can include a message, an information element, or any other portion of data.

The broadcast collective operation of FIG. 3A broadcasts (at 302) data unit A1 from rank 1 to all other ranks 2-6, which results in all of ranks 1-6 including a copy of data unit A1, which is represented by an array 304.

Figure 3B:
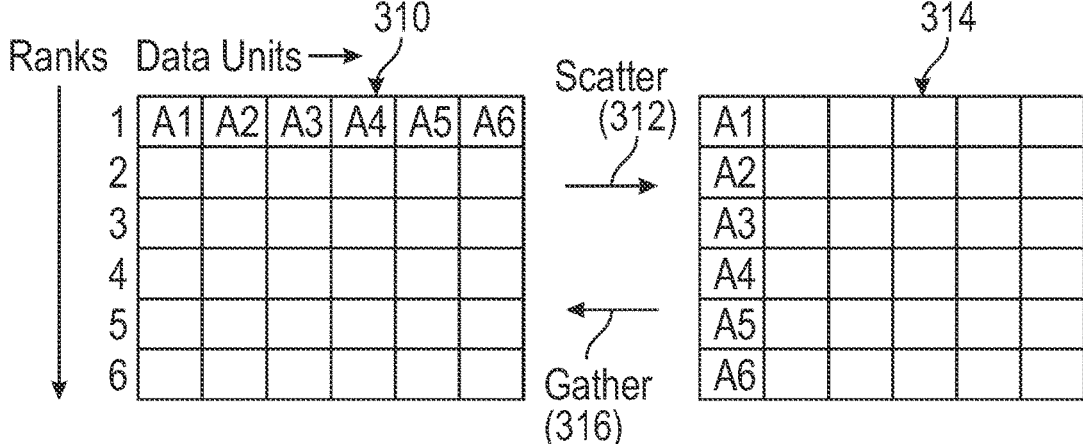

FIG. 3B shows an example scatter collective operation and an example gather collective operation. The scatter collective operation scatters (at 312) data units A1-A6 from rank 1 (as represented by an array 310) to ranks 1-6 (as represented by an array 314).

The gather collection operation gathers (at 316) data units A1-A6 (as represented by the array 314) from ranks 1-6 to rank 1 (as represented by the array 310). In some cases, a scatter-gather collective operation can be initiated, which performs both scattering and gathering of data units among ranks 1-6.

Figures 3C, 3D:
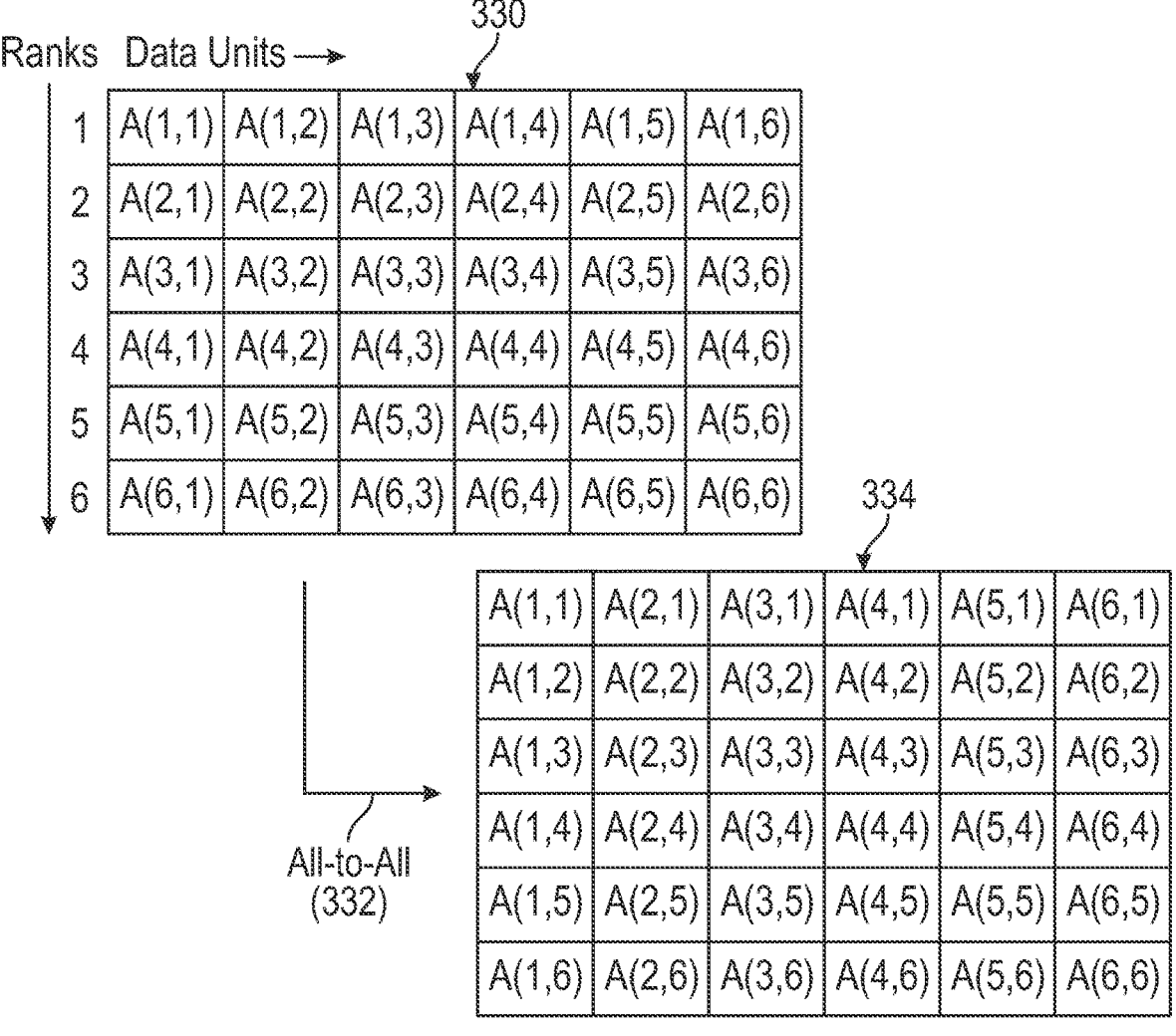

FIG. 3C shows an example all-gather collective operation, which gathers (at 322) data units A1-A6 (as represented by an array 320) from ranks 1-6 to all other ranks such that each rank has data units A1-A6 (as represented by an array 324). As represented by the array 320, data unit A1 is initially stored at rank 1, data unit A2 is initially stored at rank 2, data unit A3 is initially stored at rank 3, data unit A4 is initially stored at rank 4, data unit A5 is initially stored at rank 5, and data unit A6 is initially stored at rank 6. In the all-gather collective operation, rank 1 gathers data units A1-A6 from ranks 1-6, rank 2 gathers data units A1-A6 from ranks 1-6, rank 3 gathers data units A1-A6 from ranks 1-6, rank 4 gathers data units A1-A6 from ranks 1-6, rank 5 gathers data units A1-A6 from ranks 1-6, and rank 6 gathers data units A1-A6 from ranks 1-6. More generally, given P ranks 1 to P, where each rank j (j=1 to P) initially stores a data unit Aj, the all-gather collective operation distributes the data units A1-AP from respective ranks 1 to P to ranks 1 to P so that the data units A1-A6 are stored on each rank j.

FIG. 3D shows an example all-to-all collective operation, which distributes (at 332) data units A(1,1) to A(6,6) (as represented by an array 330) initially stored at ranks 1-6 among ranks 1-6 such that each rank has data units initially stored at the other ranks (as represented by an array 334). As represented by the array 330, data units A(1,1) to A(1,6) are initially stored at rank 1, data units A(2,1) to A(2,6) are initially stored at rank 2, data units A(3,1) to A(3,6) are initially stored at rank 3, data units A(4,1) to A(4,6) are initially stored at rank 4, data units A(5,1) to A(5,6) are initially stored at rank 5, and data units A(6,1) to A(6,6) are initially stored at rank 6. In the all-to-all collective operation, rank 1 gathers data units A(1,1), A(2,1), A(3,1), A(4,1), A(5,1), A(6,1) from ranks 1-6, rank 2 gathers data units A(1,2), A(2,2), A(3,2), A(4,2), A(5,2), A(6,2) from ranks 1-6, rank 3 gathers data units A(1,3), A(2,3), A(3,3), A(4,3), A(5,3), A(6,3) from ranks 1-6, rank 4 gathers data units A(1,4), A(2,4), A(3,4), A(4,4), A(5,4), A(6,4) from ranks 1-6, rank 5 gathers data units A(1,5), A(2,5), A(3,5), A(4,5), A(5,5), A(6,5) from ranks 1-6, and rank 6 gathers data units A(1,6), A(2,6), A(3,6), A(4,6), A(5,6), A(6,6) from ranks 1-6. More generally, given P ranks 1 to P, where each rank j (j=1 to P) initially stores a data unit A(j, k) (j=1 to P and k=1 to P), the all-to-all collective operation distributes each data unit A(j, k) initially stored by rank j to rank k.

Other types of collective operations can be performed. For example, reduce collective operations are discussed further below in connection with FIGS. 6A and 6B.

Example All-Gather Collective Operation

The following describes an example of an all-gather collective operation according to some implementations of the present disclosure. As shown in FIG. 3C, if each rank were to individually send data units from the rank to all other ranks as part of the all-gather collective operation, then 6*(6-1) or 30 data units would be exchanged in 30 individual messages. If the number of ranks P is large, then P*(P−1) exchanges of individual messages may overburden processing and communication resources of a cluster of computer nodes.

In accordance with some implementations of the present disclosure, rather than exchange P*(P−1) individual messages among P ranks, a memory region is first allocated in a network-attached memory (e.g., the FAM 106) using a memory allocation function (e.g., any of 122-1 to 122-N in FIG. 1).

In some examples, if MPI is employed, then the memory allocation function can be as follows:

```
int MPI_Alloc_mem(MPI_Aint Size,
    MPI_Info Info,
    void *baseptr),
``` where the input parameters include Size and Info, and an output parameter includes *baseptr. Although a specific example of a memory allocation function is depicted that assumes use of MPI, in other examples, other memory allocation functions can be employed for other types of collective operation programming interfaces. Size represents the size of the memory region to be allocated (the overall size of the memory region that includes the memory segments for the P ranks). Info includes information relating to the memory region to be allocated. In some examples, Info can include an information element that specifies a type of the memory region to be allocated. The type can either be a local memory type or a FAM type. If Info specifies the local memory type, then the memory region is allocated in a local memory (e.g., 116-1 to 116-N in FIG. 1). On the other hand, if Info specifies the FAM type, then the memory region is allocated in the FAM 106 (as well as in the local memory). Info can also include other information relating to the memory region to be allocated.

The output parameter *baseptr is returned by MPI_Alloc_mem( ) and includes a virtual address (VA) to be used by a rank (PE) in accessing the allocated memory region. More specifically, *baseptr is a pointer to an allocated virtual memory that starts at the virtual address and has a size specified by the input parameter Size. The MPI_Alloc_mem( ) function allocates a memory segment to each rank of the ranks involved in a collective operation.

Figure 4:
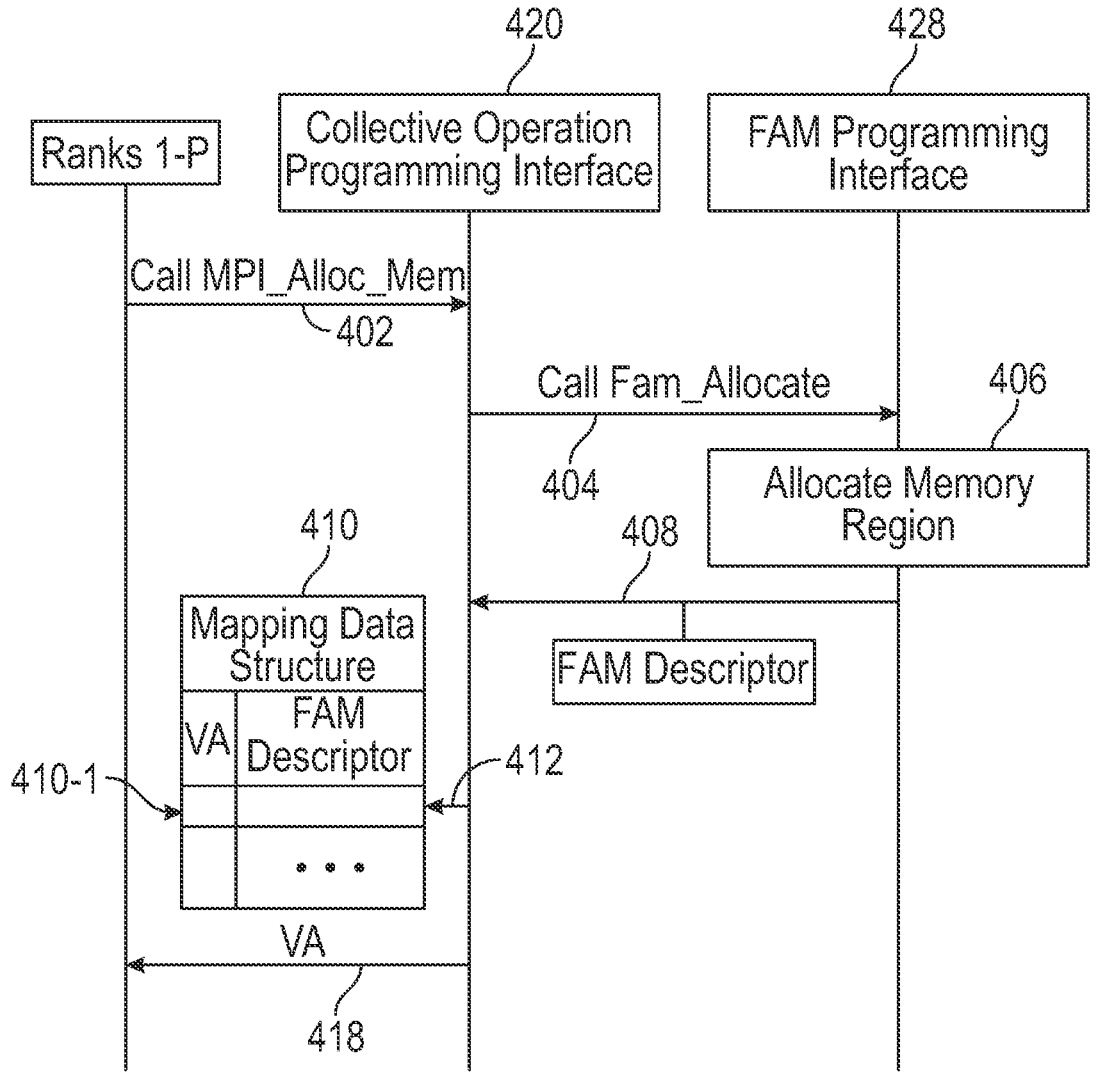
FIG. 4 depicts a flow of a memory allocation according to some examples.

FIG. 4 is a flow diagram showing a flow for a memory allocation for an all-gather collective operation according to some examples. In other examples, the tasks of FIG. 4 can be performed in a different order, some tasks may be omitted, and other tasks may be added.

Each of ranks 1-P (e.g., any of PEs 118-1 to 118-N in FIG. 1) calls (at 402) a memory allocation function in a collective operation programming interface 420 to allocate a memory region for the all-gather collective operation. The collective operation programming interface 420 is an example of any of collective operation programming interfaces 120-1 to 120-N in FIG. 1. In examples where the collective operation programming interface 420 is an MPI API, the memory allocation function called is an MPI_Alloc_mem( ) function. In response to the call from rank j (j=1 to P), the MPI_Alloc_mem( ) function allocates the requested memory region that includes memory segments (e.g., 202-1 to 202-P in FIG. 2) in the FAM 106 for corresponding ranks. Each memory segment starts at a respective offset (e.g., any of offsets 1 to P in FIG. 2) determined as a product of the rank number and the specified memory segment size. Note that the MPI_Alloc_mem( ) function also allocates a memory segment in a local memory for each rank. The memory segment allocated in the local memory can be a cache memory for the respective memory segment allocated in the FAM 106.

In some examples, the allocation of the memory region in the FAM 106 is performed by the MPI_Alloc_mem( ) function calling (at 404) an allocation function in a FAM programming interface 428 for allocating a memory region in the FAM 106. In the example of FIG. 4, this allocation function is referred to as a fam_allocate( ) function. The FAM programming interface 428 is an example of any of FAM programming interfaces 128-1 to 128-N in FIG. 1.

In an example, the fam_allocate( ) function can be an OpenFAM memory allocation function. The fam_allocate( ) can have the following syntax in some examples:

fam_allocate (Name, nbytes, . . . , Region), where Name represents a name of the memory region allocated for the collective operation, nbytes represents a size (e.g., in bytes) of the memory region, and Region represents a descriptor (referred to as "FAM descriptor") for the memory region. Although a specific example of an allocation function is depicted that assumes use of Open-FAM, in other examples, other allocation functions can be employed for other types of FAM programming interfaces among process entities.

The fam_allocate( ) function allocates (at 406) the memory region in the FAM 106. The memory region includes P memory segments for the P ranks. The fam_al-locate( ) function causes the memory severs (e.g., 108-1 to 108-N in FIG. 1) of the FAM 106 to allocate the memory region in the FAM 106.

The fam_allocate( ) function returns (at 408) a FAM descriptor for the allocated memory region. The FAM descriptor includes a starting address of the allocated memory region. The FAM descriptor can also include other information relating to the memory region. In some examples as discussed further above, an offset j of a memory segment in the memory region for a corresponding rank is computed based on a product of a rank number (j) and the memory segment size. The computed offset j is relative to the starting address of the memory region included in the FAM descriptor. For example, an offset 1 for rank 1 is the offset that when added to the starting address of the memory region produces the address of the memory segment for rank 1, and an offset P for rank P is the offset that when added to the starting address of the memory region produces the address of the memory segment for rank P.

The FAM descriptor for the allocated memory region is received by the MPI_Alloc_mem( ) function. In response to receiving the FAM descriptor, the MPI_Alloc_mem( ) function adds (at 412) an entry 410-1 to a mapping data structure 410 for rank j. The mapping data structure 410 can be stored in a local memory of a computer node. In some examples, the mapping data structure 410 can be a mapping table.

The entry 410-1 correlates the virtual address (*baseptr) to the FAM descriptor returned by the fam_allocate( ) function. Additional entries may be added to the mapping data structure 410 for other allocations of memory regions requested by rank j, such as for other collective operations. Note that there is one mapping data structure per rank in some examples, so that for P ranks there are P mapping data structures that correlate virtual addresses used by the P ranks to the FAM descriptor for the allocated memory region.

The mapping data structures used by the various ranks are examples of the allocated memory region information 126-1 to 126-N depicted in FIG. 1.

The MPI_Alloc_mem( ) function called by rank j returns (at 418) the virtual address (VA) to rank j. Similarly, the MPI_Alloc_mem( ) function called by each of the other ranks (different from j) returns a virtual address correspond-ing to the allocated memory region for use by the other rank.

Figure 5:
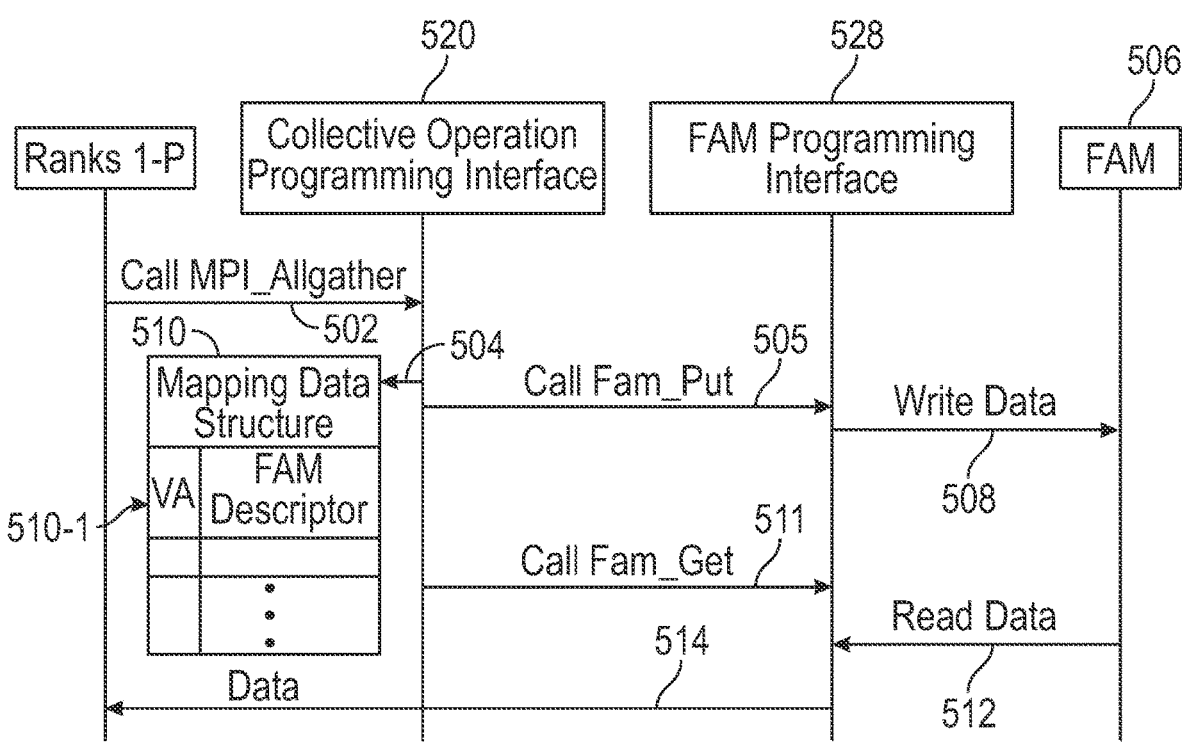
FIG. 5 depicts a flow of an all-gather collective operation according to some examples.

FIG. 5 is a flow diagram of a flow for an all-gather collective operation after the memory allocation has been performed according to FIG. 4. In other examples, the tasks of FIG. 5 can be performed in a different order, some tasks may be omitted, and other tasks may be added.

Because the all-gather collective operation is an operation that involves multiple ranks (e.g., ranks 1 to P), the multiple ranks collectively call (at 502) an all-gather function in a collective operation programming interface 520 to initiate the all-gather collective operation. The collective operation programming interface 520 is an example of any of collec-tive operation programming interfaces 120-1 to 120-N in FIG. 1. In examples where the collective operation program-ming interface 520 is an MPI API, the all-gather function called is an MPI_Allgather( ) function, which has the following syntax:

```
int MPI_Allgather(
    const void *sendbuf, int
    sendcount, MPI_Datatype
    sendtype,
    void *recvbuf,
    int recvcount, MPI_Datatype
    recvtype, MPI_Comm comm);
``` where:
  *sendbuf is the starting address of a send buffer,
  sendcount is the number of elements in the send buffer,
  sendtype is a data type of send buffer elements in the
    send buffer,
  *recvbuf is the starting address of a receive buffer,
  recvcount is the number of elements received from any
    rank,
  recvtype is a data type of receive buffer elements in the
    receive buffer, and
  comm represents the communicator group including
    the ranks involved in the collective operation.

Although a specific example of an all-gather function is depicted that assumes use of MPI, in other examples, other all-gather functions can be employed for other types of collective operation programming interfaces.

The send buffer contains data to be sent by a rank to a target, which in examples of the present disclosure is the memory region allocated in a FAM 506 for the collective operation (assuming that the Info parameter is set to indicate the FAM type in the MPI_Alloc_mem( ) function called to allocate the memory region). The FAM 506 is an example of the FAM 106 of FIG. 1. The address (*sendbuf) of the send buffer is the address of the send buffer in the local memory of the computer node in which the rank executes.

The receive buffer contains data that is to be received by the rank from other ranks. In examples where a memory region has been allocated in the FAM 506, the receive buffer includes the memory region, and *recvbuf is the address of the memory region. The address *recvbuf is set to the virtual address returned by the MPI_Alloc_mem( ) function for the collective operation.

The MPI_Allgather( ) function looks up (at 504) a mapping data structure 510 using the virtual address *recvbuf to retrieve the corresponding FAM descriptor. The mapping data structure 510 is similar to the mapping data structure 410 of FIG. 4. If an entry (e.g., 510-1) containing the virtual address *recvbuf is present in the mapping data structure 510, the corresponding FAM descriptor in the entry is returned in the lookup. A successful lookup in the mapping data structure 510 that retrieves the corresponding FAM descriptor indicates that an allocated memory region of the FAM 506 is to be used in the all-gather collective operation.

The MPI_Allgather( ) function issues a single call (at 505) of a put function in a FAM programming interface 528 to write data (at 508) in the send buffer (pointed to by *sendbuf) of each rank to the allocated memory region in the FAM 506. In the example of FIG. 4, this put function is referred to as a fam_put( ) function. The FAM programming interface 528 is an example of any of FAM programming interfaces 128-1 to 128-N in FIG. 1. Note that data for different ranks are written to respective different memory segments (at different offsets) of the memory region. If the FAM programming interface 528 is an OpenFAM API, then the fam_put( ) function is an OpenFAM function. Although a specific example of a put function is depicted that assumes use of OpenFAM, in other examples, other allocation functions can be employed for other types of FAM programming interfaces among process entities.

While the multiple ranks are writing data from their respective send buffers to respective memory segments of the memory region, a synchronization mechanism (e.g., in the form of a barrier) can be implemented to have the ranks wait for completion of the writes by all of the multiple ranks.

Once all ranks have written their data to the memory region, the MPI_Allgather( ) function issues a single call (at 511) of a get function in the FAM programming interface 128 to read data (at 512) at the virtual address (*recvbuf) of the allocated memory region in the FAM 106. In the example of FIG. 4, this get function is referred to as a fam_get( ) function. If the FAM programming interface 128 is an OpenFAM API, then the fam_get( ) function is an OpenFAM function. The data in the memory region is transferred (at 514) to the ranks to complete the all-gather collective operation.

The all-gather collective operation according to FIG. 5 includes P writes of data from the P ranks to the memory region (responsive to the fam_put( ) call), and P reads by the P ranks of the memory region (responsive to the fam_get( ) call), resulting in 2*P communications between the ranks and the FAM 106.

Note that legacy programs that do not support use of the FAM 106 for collective operations can continue to perform the collective operations using local memories. Also, even if the FAM 106 is not present, programs can perform the collective operations using local memories.

Other types of collective operations such as scatter, gather, all-to-all, or other operations involving multiple process entities, can be performed in similar manner.

Example Reduce Operation

Figure 6A:
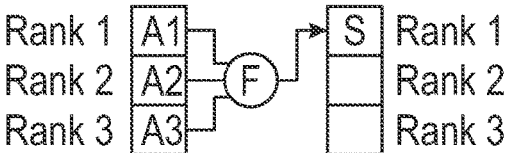
FIGS. 6A-6B illustrate reduce collective operations according to some examples.

Another type of collective operation includes reduce collective operations. FIG. 6A depicts a reduce operation involving ranks 1, 2, and 3 that initially store data units A1, A2, and A3, respectively. The reduce operation of FIG. 6A collects the data units A1, A2, and A3 from the ranks 1, 2, and 3, and applies a reduction operation F (e.g., sum, maximum, minimum, median, average, or another operation that aggregates data) on the data units. The output value produced by the reduction operation F based on A1, A2, and A3 is S, and the output value is stored at rank 1.

Figure 6B:
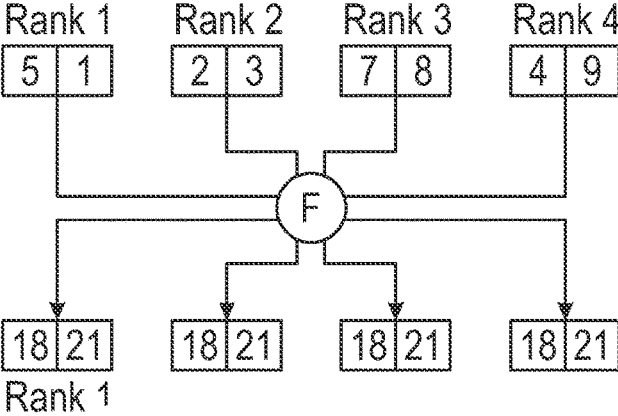

FIG. 6B depicts an all-reduce collective operation. Ranks 1-4 are involved in the all-reduce collective operation. Each rank initially stores a vector with two data elements. For example, rank 1 initially stores a vector [5, 1], rank 2 initially stores a vector [2, 3], rank 3 initially stores a vector [7, 8], and rank 4 initially stores a vector [4, 9]. A reduction function F in FIG. 6B applies an indexed vector sum operation, in which data values at a first index of the vectors are added together (i.e., 5+2+7+4) to produce 18, and data values at a second index are added together (i.e., 1+3+8+9) to produce 21. The reduction function F thus produces an output vector (18, 21) that is distributed to each of ranks 1, 2, 3, and 4, as shown in FIG. 6B.

Figure 7:
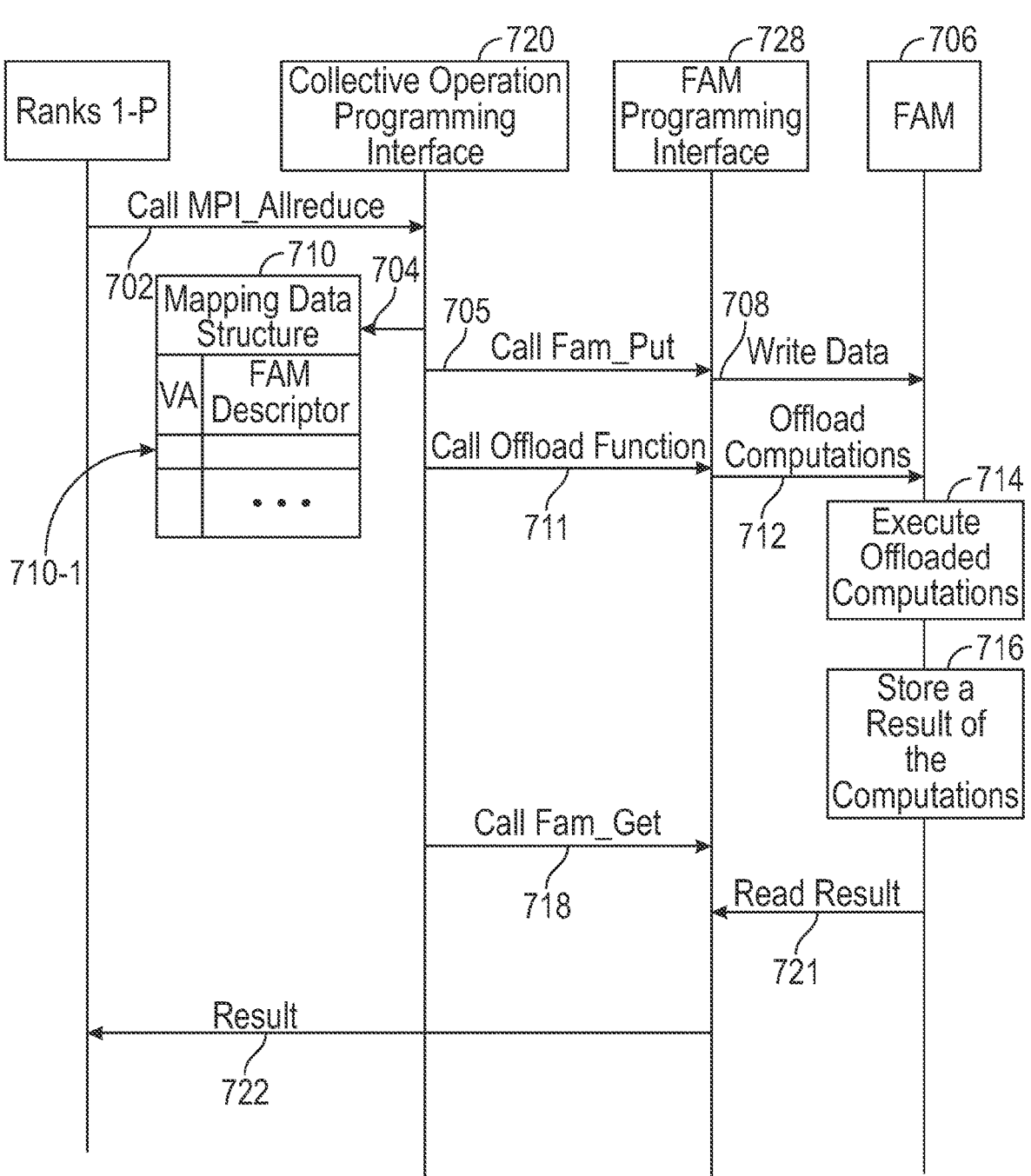
FIG. 7 depicts a flow of an all-reduce collective operation according to some examples.

FIG. 7 is a flow diagram of a flow for an all-reduce collective operation after a memory allocation has been performed, such as according to FIG. 4. In other examples, the tasks of FIG. 7 can be performed in a different order, some tasks may be omitted, and other tasks may be added.

Because the all-reduce collective operation is an operation that involves multiple ranks (e.g., ranks 1 to P), the multiple ranks collectively call (at 702) an all-reduce function in a collective operation programming interface 720 to initiate the all-reduce collective operation. The collective operation programming interface 720 is an example of any of the collective operation programming interfaces 120-1 to 120-N in FIG. 1. In examples where the collective operation programming interface 720 is an MPI API, the all-reduce function called is an MPI_Allreduce( ) function, which has the following syntax:

```
int MPI_Allreduce(
    const void *sendbuf, void *recvbuf,
    int count, MPI_Datatype
    datatype, MPI_Op op,
    MPI_Comm comm);
``` where:
  *sendbuf is the starting address of a send buffer,
  *recvbuf is the starting address of a receive buffer,
  count represents a number of elements in the send buffer,
  datatype represents a type of data in the send buffer,
  op represents the reduction operation to be executed, and
  comm represents the communicator (group).

Although a specific example of an all-reduce function is depicted that assumes use of MPI, in other examples, other all-reduce functions can be employed for other types of collective operation programming interfaces.

In examples where a memory region has been allocated in a FAM 706, the receive buffer includes the memory region, and *recvbuf is the address of the memory region. The FAM 706 is an example of the FAM 106 of FIG. 1. The address *recvbuf is set to the virtual address returned by the MPI_Alloc_mem( ) function for the collective operation.

The MPI_Allreduce( ) function looks up (at 704) a mapping data structure 710 using the virtual address *recvbuf to retrieve the corresponding FAM descriptor. The mapping data structure 710 is similar to the mapping data structure 410 of FIG. 4. If an entry (e.g., 710-1) containing the virtual address *recvbuf is present in the mapping data structure 710, the corresponding FAM descriptor in the entry is returned in the lookup. A successful lookup in the mapping data structure 710 that retrieves the corresponding FAM descriptor indicates that an allocated memory region of the FAM 706 is to be used in the all-reduce collective operation.

The MPI_Allreduce( ) function issues a single call (at 705) of a put function (referred to as fam_put( ) in the example) in the FAM programming interface 128 to write data (at 708) in the send buffer (pointed to by *sendbuf) of each rank to the allocated memory region in the FAM 706. Note that data for different ranks are written to respective different memory segments (at different offsets) of the memory region.

While the multiple ranks are writing data from their respective send buffers to respective memory segments of the memory region, a synchronization mechanism can be implemented to have the ranks wait for completion of the writes by all of the multiple ranks.

Once all ranks have written their data to the memory region, the MPI_Allreduce( ) function issues a call (at 711) of an offload function to initiate a memory-side operation at the memory servers (e.g., 108-1 to 108-M) of the FAM 706 to perform the reduction operation specified by the parameter op. In an example, the offload function can be a function that is part of a FAM programming interface 728. The FAM programming interface 728 is an example of any of the FAM programming interfaces 128-1 to 128-N in FIG. 1.

In some examples, the offload function can cause a FAM client (e.g., one or more of 130-1 to 130-N) to queue computations of the reduction operation into queues, and after queuing the computations, send (at 712) the computations to the memory servers for execution.

The memory servers in the FAM 106 execute (at 714) the offloaded computations of the reduction operation, and the memory servers store (at 716) a result of the reduction operation in the memory region in the FAM 106, such as in a temporary buffer allocated in the memory region.

In some examples, a wait object, waitObj, can be used to cause the ranks 1 to P to wait for the completion of the computations of the reduction operation by the memory servers. A wait object causes a PE (rank) to pause execution pending completion of an operation by other processes (e.g., threads in the memory servers that perform the offloaded computations). The wait object can include a status indicator to indicate whether or not the operation has completed. In other examples, other types of status indicators can be employed to allow a memory server to indicate that an offloaded operation has been completed. When a FAM client detects that the result of the offloaded computations is available, the FAM client returns the wait object, waitObj, to one or more waiting PEs. In some examples, the FAM client can detect that the result is available based on the memory servers providing an indication (e.g., a signal, a message, an information element, or any another type of indicator) regarding completion of the offloaded computations at the memory servers. The waiting PE(s) can periodically or intermittently check waitObj, to determine the status of waitObj. If waitObj indicates that the offloaded computations are completed by the memory servers is complete, then a result of the offloaded operation can be provided to the PE(s).

Once the result of the reduction operation is ready, the MPI_Allreduce( ) function issues a call (at 718) of a get function (referred to as fam_get( ) in the example) in the FAM programming interface 128 to read the result (at 721) at the virtual address (*recvbuf) of the allocated memory region in the FAM 106. The fam_get( ) function may be called in response to a request from the ranks 1 to P. The result in the memory region is transferred (at 722) to the ranks to complete the all-reduce collective operation.

The all-reduce collective operation according to FIG. 7 includes 2*P communications between ranks and the FAM 706. In addition, the computations of the reduction operation are offloaded to the memory servers of the FAM 706, which can leverage the available processing resources of the memory servers and reduces the likelihood of overburdening the computer nodes 102-1 to 102-N.

Other types of collective operations that involve computations can be performed in a similar manner, where the computations are offloaded to the memory servers of the FAM 706.

FURTHER EXAMPLES

FIG. 8 depicts a flow of performing a collective operation using an allocated memory region of a network-attached memory, according to some examples. The flow of FIG. 8 includes receiving (at 802), by a processor of a first computer node, a first request to allocate a memory region for a collective operation by process entities in a plurality of computer nodes. The first request can include a call of a memory allocation function in a collective operation programming interface, for example. In more specific examples, the memory allocation function can be an MPI memory allocation function, MPI_Alloc_mem( ).

The flow of FIG. 8 includes in response the first request, creating (at 804), by the processor, a virtual address for the memory region and allocating (at 806) the memory region in a network-attached memory coupled to the plurality of computer nodes over a network. Creating the virtual address can refer to selecting the virtual address from among multiple virtual addresses of a virtual address range associated with the network-attached memory. Allocating the memory region can refer to assigning an area of the network-attached memory for use by a requesting entity, such as a PE.

The flow of FIG. 8 includes correlating (at 808), by the processor, the virtual address to an address of the memory region in mapping information stored in the first computer node. An example of the mapping information is the mapping data structure 410 of FIG. 4, for example. Correlating the virtual address to the address of the memory region in the mapping information can refer to defining an association between the virtual address and the address of the memory region, and adding information of such a defined association to an entry of the mapping information.

The flow of FIG. 8 includes receiving (at 810), by the processor, a second request to perform the collective operation, the second request including the virtual address. The second request can include a call of a collective operation function (e.g., MPI_Allgather, MPI_Allreduce, or another type of operation that involves multiple process entities) in the collective operation programming interface.

The flow of FIG. 8 includes identifying (at 812), by the processor, the memory region in the network-attached memory by obtaining the address of the memory region from the mapping information using the virtual address included in the second request. Identifying the memory region can refer to obtaining information that allows the memory region to be referenced and used by a requesting entity, such as a process entity. For example, the identification includes looking up the mapping data structure 410 using the virtual address to find an entry that includes a FAM descriptor correlated to the virtual address.

The flow of FIG. 8 includes in response to the second request, performing (at 814), by the processor, the collective operation including writing a first data unit of the first computer node to a first segment of the memory region and accessing a second data unit written by a second computer node from a second segment of the memory region. Performing the collective operation can refer to executing tasks of the collective operation.

In some examples, the processor confirms that the network-attached memory is used for the collective operation in response to successfully performing a lookup of the mapping information using the virtual address.

In some examples, a plurality of memory servers (that manage the allocation of the memory region and access of data in the network-attached memory) perform computations of a collective operation on a plurality of data units stored in the network-attached memory. In some examples, the performance of the computations by the plurality of memory servers is in response to an offload request from a computer node.

In some examples, the allocating of the memory region in the network-attached memory includes allocating the first segment of the memory region to a first process entity in the first computer node, and allocating the second segment of the memory region to a second process entity in the second computer node.

In some examples, each of the first process entity and the second process entity is assigned a rank number, the allocating of the first segment of the memory region to the first process entity includes allocating the first segment starting at a first offset based on the rank number of the first process entity, and the allocating of the second segment of the memory region to the second process entity includes allocating the second segment starting at a second offset based on the rank number of the second process entity.

In some examples, the allocating of the memory region in the network-attached memory in response the first request is responsive to the first request including first configuration information having a first value indicating use of the network-attached memory for the collective operation. The configuration information can include the input parameter Info of the MPI_Alloc_mem( ) function, for example.

In some examples, the processor of the first computer node receives a third request to allocate a further memory region for a further collective operation by the plurality of computer nodes. The third request includes second configuration information having a second value indicating use of a local memory of the first computer node for the further collective operation. In response to the third request, the processor allocates the further memory region in the local memory of the computer node.

Figure 9:
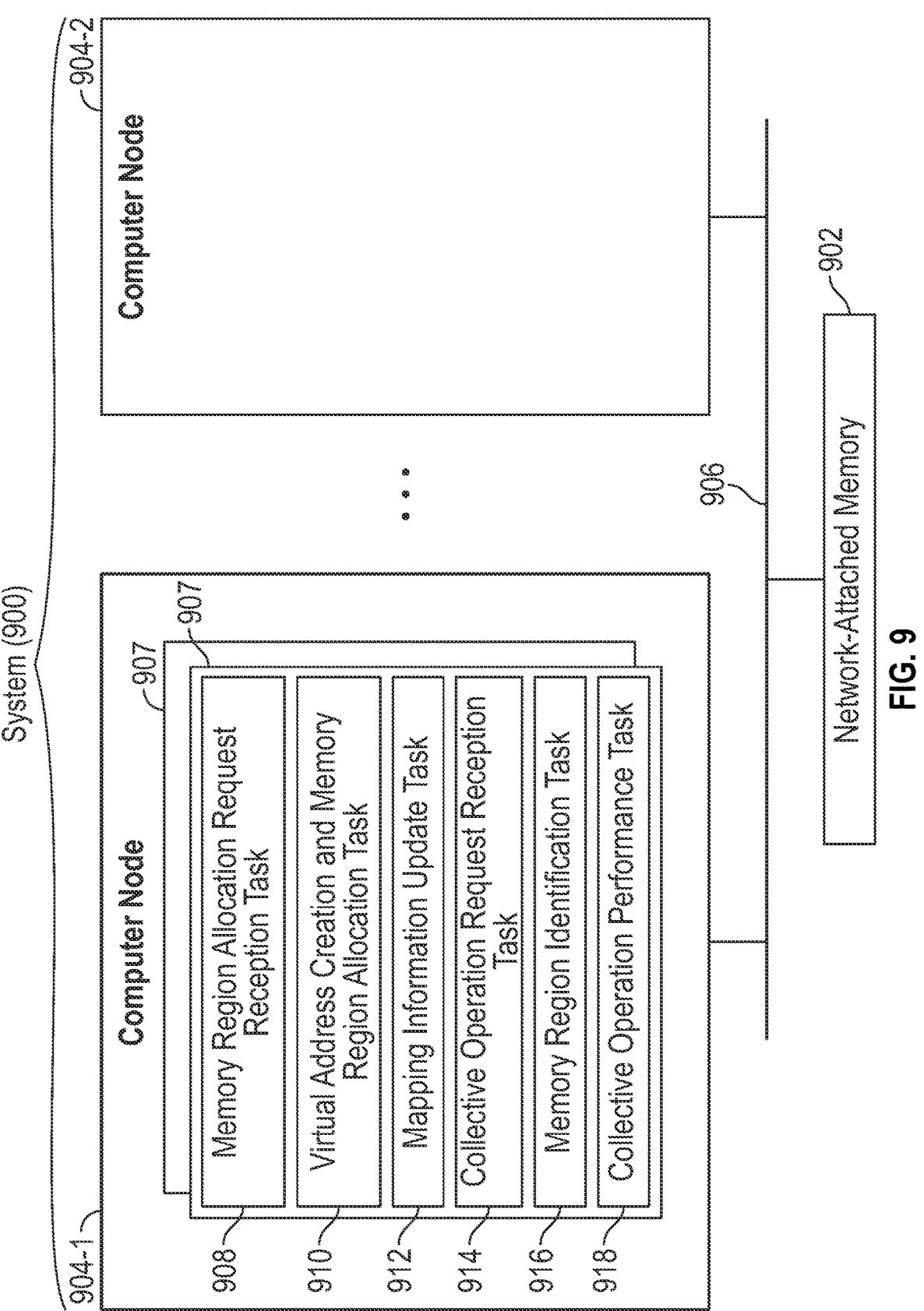
FIG. 9 is a block diagram of a system according to some examples.

FIG. 9 is a block diagram of a system 900 according to some examples. The system 900 includes a network-attached memory 902, such as the FAM 106 of FIG. 1. The system 900 further includes a plurality of computer nodes 904-1, 904-2 coupled to the network-attached memory 902 over a network 906. The computer node 904-1 includes one or more hardware processors 907 configured to perform various tasks. A hardware processor can include a microprocessor, a core of a multi-core microprocessor, a microcontroller, a programmable integrated circuit, a programmable gate array, or another hardware processing circuit.

Although FIG. 9 shows the tasks being performed by the computer node 904-1, note that the other computer node 904-2 can perform some or all of the tasks of the computer node 904-1.

The tasks of the one or more hardware processors 907 include a memory region allocation request reception task 908 that receives a first request to allocate a memory region for a collective operation by process entities in the plurality of computer nodes 904. The first request includes a first value indicating use of the network-attached memory 902 for the collective operation.

The tasks of the one or more hardware processors 907 include a virtual address creation and memory region allocation task 910 to, in response to the first request including the first value, create a virtual address for the memory region and allocate the memory region in the network-attached memory. Creating the virtual address can refer to selecting the virtual address from among multiple virtual addresses of a virtual address range associated with the network-attached memory 902. Allocating the memory region can refer to assigning an area of the network-attached memory 902 for use by a requesting entity, such as a PE.

The tasks of the one or more hardware processors 907 include a mapping information update task 912 to add, to mapping information, an entry correlating the virtual address to an address of the memory region in the network-attached memory. The mapping information can be the mapping data structure 410 of FIG. 4, for example. Adding the entry to the mapping information can refer to adding information that defines an association between the virtual address and the address of the memory region to the mapping information.

The tasks of the one or more hardware processors 907 include a collective operation request reception task 914 to receive a second request to perform the collective operation. The second request including the virtual address.

The tasks of the one or more hardware processors 907 include a memory region identification task 916 to identify the memory region in the network-attached memory by obtaining the address of the memory region from the mapping information using the virtual address included in the second request. Identifying the memory region can refer to obtaining information that allows the memory region to be referenced and used by a requesting entity, such as a process entity.

The tasks of the one or more hardware processors 907 include a collective operation performance task 918 to in response to the second request, perform the collective operation including writing a first data unit of the first computer node to a first segment of the memory region and accessing a second data unit written by a second computer node from a second segment of the memory region. Performing the collective operation can refer to executing tasks of the collective operation.

Figure 10:
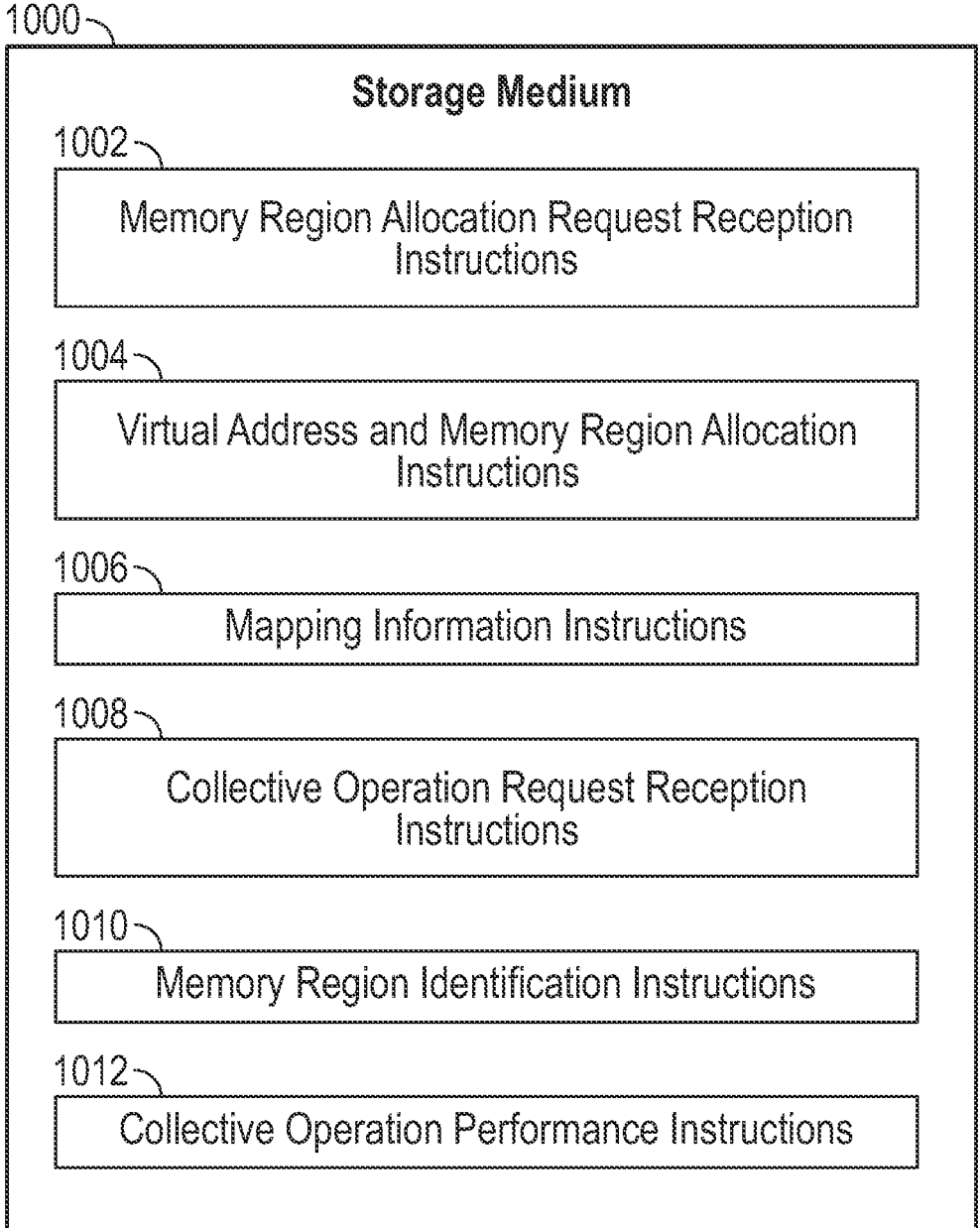
FIG. 10 is a block diagram of a storage medium storing machine-readable instructions according to some examples.

FIG. 10 is a block diagram of a non-transitory machine-readable or computer-readable storage medium 1000 storing machine-readable instructions that upon execution cause a system to perform various tasks. The machine-readable instructions can execute in the computer nodes 102-1 to 102-N of FIG. 1, for example.

The machine-readable instructions include memory region request reception instructions 1002 to receive, at a first computer node, a first request to allocate a memory region for a collective operation by a plurality of computer nodes.

The machine-readable instructions include virtual address creation and memory region allocation instructions 1004 to, in response the first request, create a virtual address for the memory region and allocate the memory region in a network-attached memory coupled to the plurality of computer nodes over a network.

The machine-readable instructions include mapping information instructions 1006 to correlate the virtual address to an address of the memory region in mapping information stored in the first computer node. For example, the correlation includes adding an entry to the mapping data structure 410 of FIG. 4, for example.

The machine-readable instructions include collective operation request reception instructions 1008 to receive a second request to perform the collective operation, the second request including the virtual address.

The machine-readable instructions include memory region identification instructions 1010 to identify the memory region in the network-attached memory by obtaining the address of the memory region from the mapping information using the virtual address included in the second request.

The machine-readable instructions include collective operation performance instructions 1012 to, in response to the second request, perform the collective operation including writing a first data unit of the first computer node to a first segment of the memory region and accessing a second data unit written by a second computer node from a second segment of the memory region.

A storage medium (e.g., 1000 in FIG. 10) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a processor of a first computer node, a first request to allocate a memory region of fabric attached memory having a memory server external to the first computer node, wherein the allocation of memory is for a collective operation with the memory region as an intermediary mechanism for exchanging data between a plurality of computer nodes in the collective operation, wherein the collective operation comprises a pattern of communications among process entities in the plurality of computer nodes that includes the first computer node, and wherein the fabric attached memory includes a memory server separate from the plurality of computer nodes;

in response the first request, creating, by the processor, a virtual address for the memory region and allocating the memory region coupled to the plurality of computer nodes over a network;

correlating, by the processor, the virtual address to an address of the memory region in mapping information stored in the first computer node;

receiving, by the processor, a second request to perform the collective operation, the second request comprising the virtual address;

identifying, by the processor, the memory region by obtaining the address of the memory region from the mapping information using the virtual address in the second request; and in response to the second request, performing, by the processor, the collective operation comprising writing a first data unit of the first computer node to a first segment of the memory region and accessing a second data unit written by a second computer node from a second segment of the memory region, wherein performing the collective operation comprises exchanging data between the first and second computer nodes via the memory region at least partially instead of sending direct messages between the first and second computer nodes as part of the collective operation.

2. The method of claim 1, further comprising:
   in response to the second request, performing, by a processor of the second computer node, the collective operation by writing the second data unit to the second segment of the memory region and accessing the first data unit from the first segment of the memory region.

3. The method of claim 1, further comprising:
   performing, by a plurality of memory servers managing the allocation of the memory region and access of data in the fabric attached memory, computations of a further collective operation on a plurality of data units stored in the fabric attached memory.

4. The method of claim 3, further comprising:
   retrieving, by the plurality of computer nodes, a result of the computations from the fabric attached memory.

5. The method of claim 3, wherein the performing of the computations by the plurality of memory servers is in response to an offload request from the first computer node.

6. The method of claim 1, wherein the allocating of the memory region in the fabric attached memory comprises allocating the first segment of the memory region to a first process entity in the first computer node, and allocating the second segment of the memory region to a second process entity in the second computer node.

7. The method of claim 6, wherein each of the first process entity and the second process entity is assigned a rank number, the allocating of the first segment of the memory region to the first process entity comprises allocating the first segment starting at a first offset based on the rank number of the first process entity, and the allocating of the second segment of the memory region to the second process entity comprises allocating the second segment starting at a second offset based on the rank number of the second process entity.

8. The method of claim 1, wherein the allocating of the memory region in the fabric attached memory in response the first request is responsive to the first request comprising first configuration information having a first value indicating use of the fabric attached memory for the collective operation.

9. The method of claim 8, further comprising:

receiving, by the processor of the first computer node, a third request to allocate a further memory region for a further collective operation by the plurality of computer nodes, the third request comprising second configuration information having a second value indicating use of a local memory of the first computer node for the further collective operation; and in response to the third request, allocating, by the processor, the further memory region in the local memory of the first computer node.

10. The method of claim 1, wherein the performing, by the processor, of the collective operation further comprises accessing a third data unit written by a third computer node from a third segment of the memory region.

11. The method of claim 1, wherein the collective operation comprises a Message Passing Interface (MPI) collective operation.

12. The method of claim 1, wherein the mapping information correlates the virtual address to a descriptor that comprises addresses of memory segments in the memory region in the fabric attached memory, the memory segments allocated to the process entities in the plurality of computer nodes.

13. The method of claim 1, comprising:

confirming that the fabric attached memory is used for the collective operation in response to successfully performing a lookup of the mapping information using the virtual address.

14. The method of claim 1, wherein the collective operation is performed by the process entities executing in the plurality of computer nodes, the first request is issued by a first process entity of the process entities, and the method comprises:

retrieving, by a second process entity of the process entities, the mapping information; and using, by the second process entity, the mapping information in the collective operation.

15. A system comprising:

a fabric attached memory; and a plurality of computer nodes coupled to the fabric attached memory over a network, the plurality of computer nodes comprising a first computer node and a second computer node, the fabric attached memory having a memory server external to the first computer node, and the first computer node comprising a processor configured to:

receive a first request to allocate a memory region of the fabric attached memory, wherein the allocation of memory is for a collective operation with the memory region as an intermediary mechanism for exchanging data between the plurality of computer nodes in the collective operation, wherein the collective operation comprises a pattern of communications among process entities in the plurality of computer nodes, the first request comprising a first value indicating use of the fabric attached memory for the collective operation;

in response to the first request comprising the first value, create a virtual address for the memory region and allocate the memory region in the fabric attached memory;

add, to mapping information, an entry correlating the virtual address to an address of the memory region in the fabric attached memory;

receive a second request to perform the collective operation, the second request comprising the virtual address;

identify the memory region in the fabric attached memory by obtaining the address of the memory region from the mapping information using the virtual address in the second request; and in response to the second request, perform the collective operation by writing a first data unit of the first computer node to a first segment of the memory region and accessing a second data unit written by the second computer node from a second segment of the memory region, wherein performing the collective operation comprises exchanging data between the first and second computer nodes via the memory region at least partially instead of sending direct messages between the first and second computer nodes as part of the collective operation.

16. The system of claim 15, wherein the fabric attached memory comprises a plurality of memory servers configured to execute computations of a further collective operation offloaded from the plurality of computer nodes to the plurality of memory servers.

17. The system of claim 16, wherein the plurality of memory servers are configured to store a result of the computations in the memory region, and the plurality of computer nodes are configured to retrieve the result from the memory region.

18. The system of claim 15, wherein the allocating of the memory region in the fabric attached memory comprises allocating the first segment of the memory region to a first process entity in the first computer node, and allocating the second segment of the memory region to a second process entity in the second computer node, and wherein each of the first process entity and the second process entity is assigned a rank number, the allocating of the first segment of the memory region to the first process entity comprises allocating the first segment starting at a first offset based on the rank number of the first process entity, and the allocating of the second segment of the memory region to the second process entity comprises allocating the second segment starting at a second offset based on the rank number of the second process entity.

19. A non-transitory machine-readable storage medium comprising instructions that upon execution cause a system to:

receive, at a first computer node, a first request to allocate a memory region of a fabric attached memory having a memory server external to the first computer node, wherein the allocation of memory is for a collective operation with the memory region as an intermediary mechanism for exchanging data between a plurality of computer nodes in the collective operation, wherein the collective operation comprises a pattern of communications among process entities in the plurality of computer nodes that includes the first computer node;

in response the first request, create a virtual address for the memory region and allocate the memory region coupled to the plurality of computer nodes over a network;

correlate the virtual address to an address of the memory region in mapping information stored in the first computer node;

receive a second request to perform the collective operation, the second request comprising the virtual address;

identify the memory region by obtaining the address of the memory region from the mapping information using the virtual address in the second request; and in response to the second request, perform the collective operation by writing a first data unit of the first computer node to a first segment of the memory region and accessing a second data unit written by a second computer node from a second segment of the memory region, wherein performing the collective operation comprises exchanging data between the first and second computer nodes via the memory region at least partially instead of sending direct messages between the first and second computer nodes as part of the collective operation.

20. The non-transitory machine-readable storage medium of claim 19, wherein the collective operation is performed by P process entities in the plurality of computer nodes, and the collective operation involves $2*(P-1)$ communications of data units that complete the collective operation, and wherein P is greater than or equal to 2.

\* \* \* \* \*